(12) United States Patent
Turi

(10) Patent No.: US 7,490,593 B2
(45) Date of Patent: Feb. 17, 2009

(54) MAGNETIC CONDITIONING APPARATUS FOR DIESEL ENGINE FUEL

(76) Inventor: Carlo Turi, Via Graziano, 57, Roma (IT) I-00167

(*) Notice: Subject to any disclaimer, the term of this patent is extended or adjusted under 35 U.S.C. 154(b) by 0 days.

(21) Appl. No.: 10/530,204

(22) PCT Filed: Sep. 26, 2003

(86) PCT No.: PCT/IT03/00576

§ 371 (c)(1), (2), (4) Date: Apr. 4, 2005

(87) PCT Pub. No.: WO2004/031566

PCT Pub. Date: Apr. 15, 2004

(65) Prior Publication Data

US 2006/0048758 A1     Mar. 9, 2006

(30) Foreign Application Priority Data

Oct. 2, 2002     (IT)     .............................. RM02A0495

(51) Int. Cl.
*F02M 27/04*     (2006.01)
(52) U.S. Cl. .................................................... 123/538
(58) Field of Classification Search ......... 123/536–538; 210/222, 695
See application file for complete search history.

(56) References Cited

U.S. PATENT DOCUMENTS

| | | | |
|---|---|---|---|
| 4,050,426 A | 9/1977 | Sanderson | |
| 4,519,919 A | 5/1985 | Whyte et al. | |
| 5,055,188 A * | 10/1991 | Johnston et al. | 210/222 |
| 5,359,979 A * | 11/1994 | Anfinson et al. | 123/538 |
| 5,558,765 A * | 9/1996 | Twardzik | 210/222 |
| 5,992,398 A * | 11/1999 | Ho | 123/538 |
| 6,041,763 A * | 3/2000 | Akyildiz | 123/538 |
| 6,178,953 B1 * | 1/2001 | Cox | 123/536 |
| 6,220,231 B1 * | 4/2001 | Kobayashi | 123/538 |
| 6,596,163 B1 * | 7/2003 | Parker | 210/222 |
| 6,599,419 B2 * | 7/2003 | Hagans | 210/222 |
| 6,849,188 B2 * | 2/2005 | Sacs | 210/695 |
| 6,890,432 B1 * | 5/2005 | Witz et al. | 210/222 |

FOREIGN PATENT DOCUMENTS

| | | |
|---|---|---|
| CA | 2 270 063 | 10/2000 |
| EP | 0 399 801 | 11/1990 |
| WO | WO 97/29279 | 8/1997 |

* cited by examiner

*Primary Examiner*—M. McMahon
(74) *Attorney, Agent, or Firm*—Young & Thompson

(57) ABSTRACT

A magnetic conditioning device for diesel engine fuel includes a housing element, placed along the fuel feeding line, having a fuel inlet and a fuel outlet, and providing a septum in correspondence of the inlet to deviate the inlet fuel, and an obliged path for the fuel, being provided at least two opposed magnetic elements. Along the obliged path, a magnetic field is induced on the flowing fuel.

7 Claims, 10 Drawing Sheets

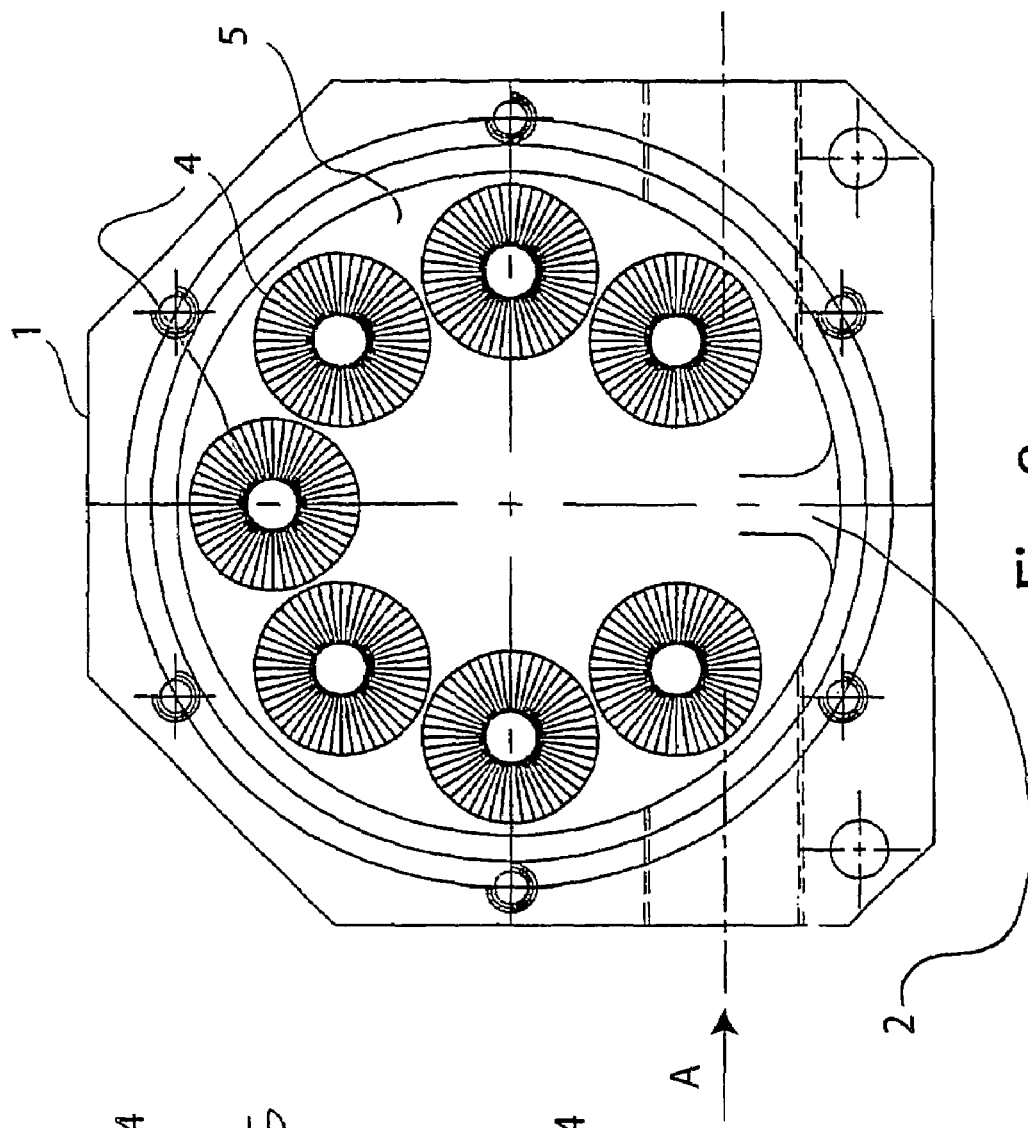
Fig. 9
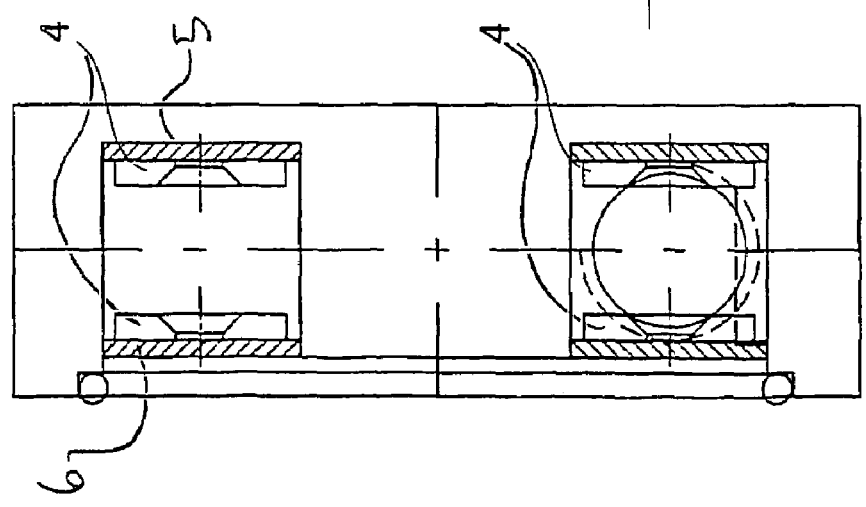
Fig. 10

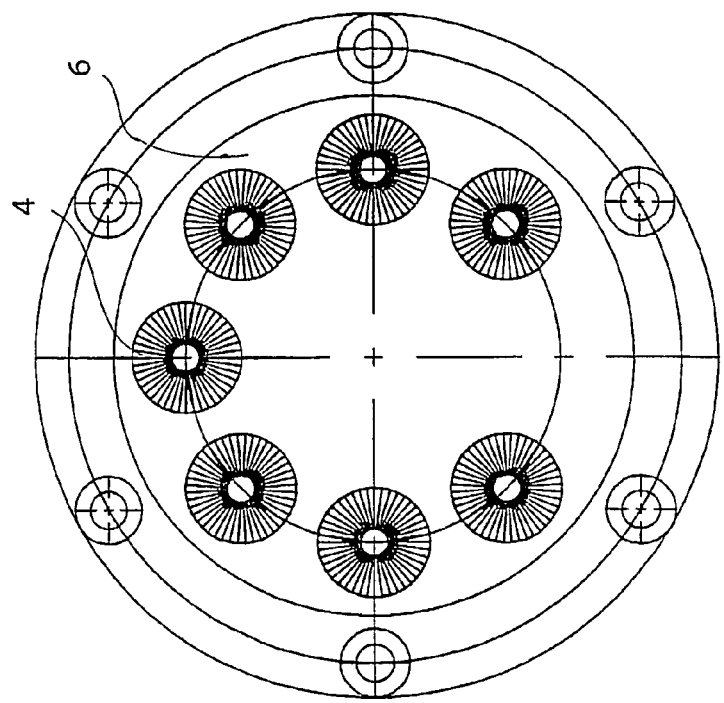
Fig. 13b
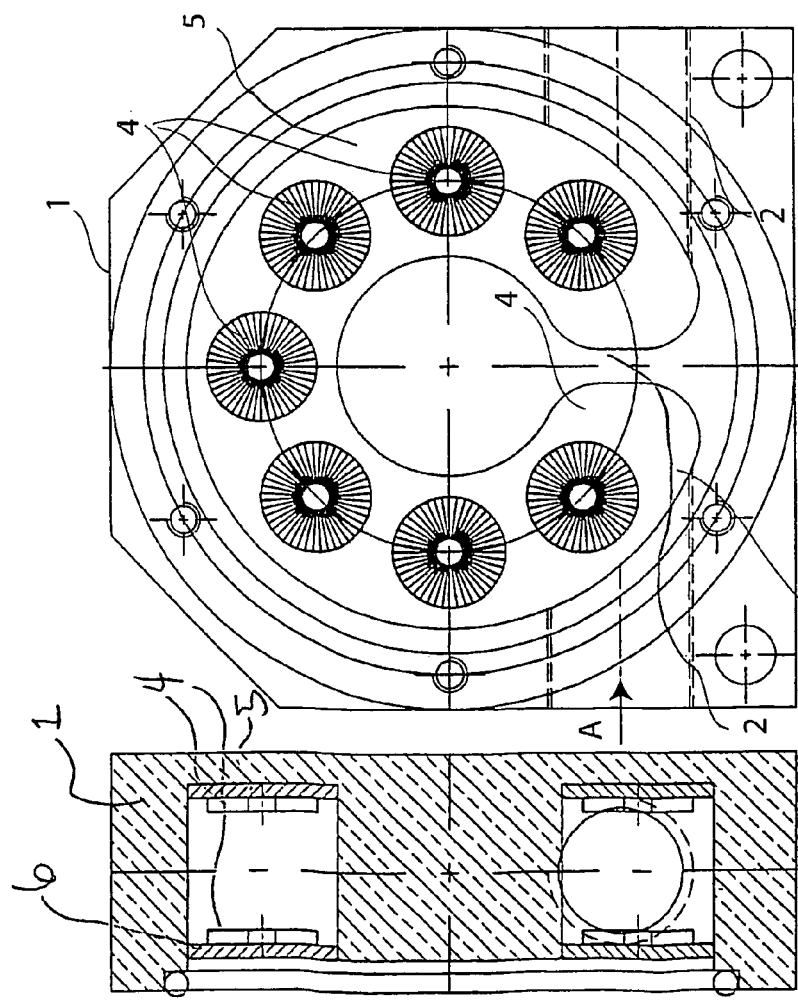
Fig. 13a
Fig. 14

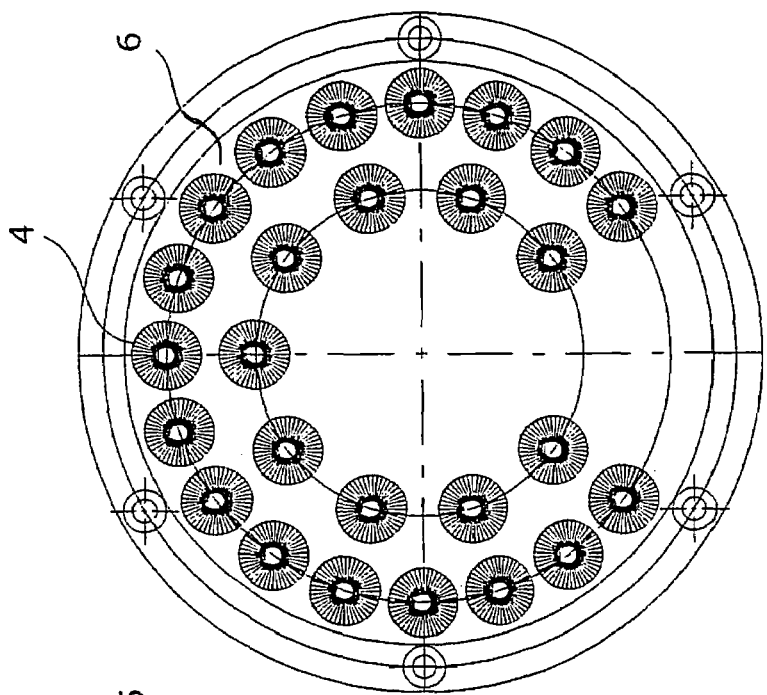
Fig. 17a
Fig. 17b
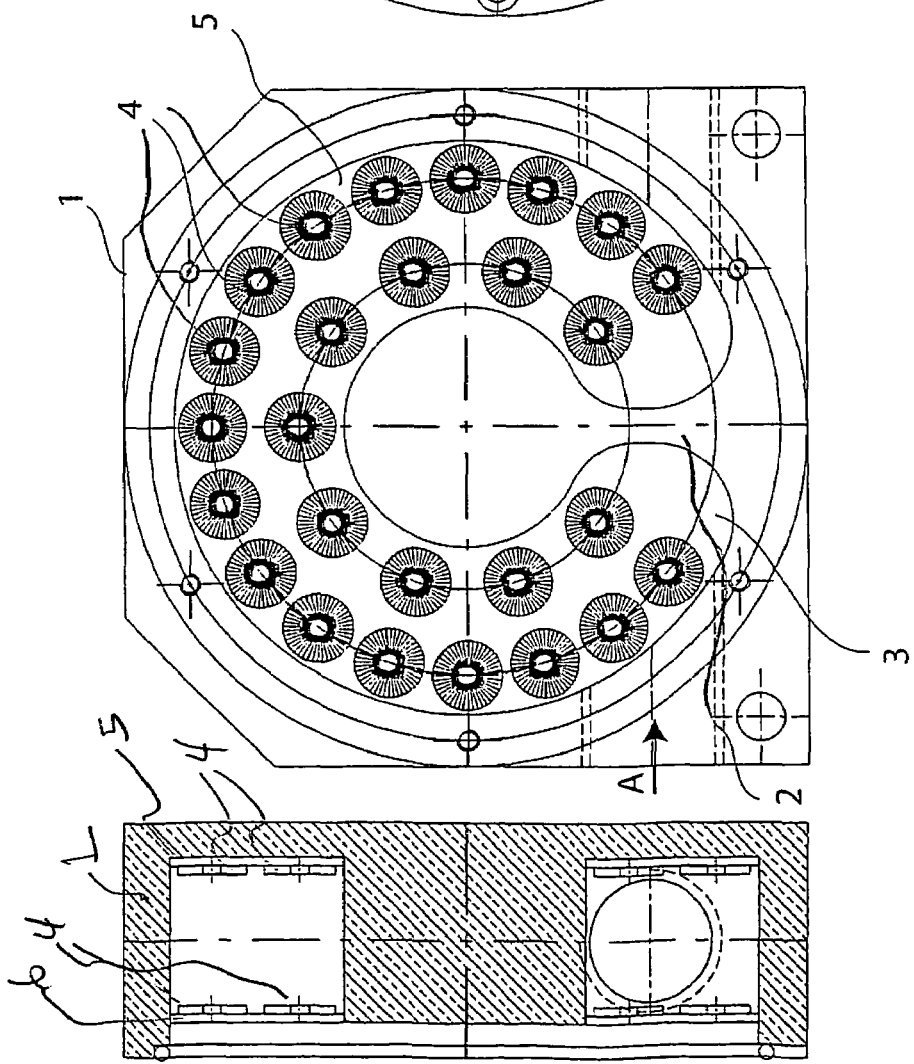
Fig. 18

MAGNETIC CONDITIONING APPARATUS FOR DIESEL ENGINE FUEL

The present invention relates to a magnetic conditioning device for diesel engine fuel.

More specifically, the invention relates to a magnetic conditioning device allowing to obtain an enhanced separation of impurities present in the diesel fuel, thus inducing a better ionisation of the same.

Many devices are known since many years employing various magnetic fields to improve the purity of diesel engine fuel.

For example, in U.S. Pat. No. 5,161,512, and in the corresponding European Patent No 0 613 399, in the name of AZ industries, Incorporated, filed on Sep. 17, 1992, it is described a magnetic conditioning device for fluids, wherein opposed magnetic poles of relevant aligned magnets are provided, with radial lines inclined in a different way with respect to the central axis of the conduit within which the fuel flows.

In U.S. Pat. No. 5,359,979, filed on Mar. 29, 1994, it is described a magnetic conditioning device for fluids, with a plug made up of ferromagnetic material, extending within the inner hole of an annular permanent magnet, divided by a well defined space. A pair of ferromagnetic ends are coupled to a pair of plates. Magnet emits a focalised, concentrated magnetic field, sliding within the fuel.

In the Italian patent No 1,269,246, filed on Aug. 3, 1993 in the name of Giuseppe Grieco, it is described a high potential magnetic field particle conditioner for treatment of water and hydrocarbons, comprised of a series of four pairs of permanent magnets coupled on the back to two anchors, with the air gap placed axially aligned with respect to the liquid adduction channels, with two frusto-conical portions connecting the channels with the air gap.

In the Italian Utility Model Patent No 244,584 filed on Oct. 27, 1998 in the name of BI.MA.TEC S.r.l. it is described a variable closure body for magnetic conditioning devices for fluids, providing the mounting about a tube through which the liquid fuel flows.

In the Italian patent No 1,291,252, filed on Mar. 11, 1997 in the name of Roberto Morris it is described a device for magnetic conditioning of fluids by a magnetic field wherein it is provided a permanent magnet provided outside a diamagnetic tube for the conduction of the fluid in such a way to create a magnetic field passing through the fuel flowing within the tube.

In the Italian patent No 1,197,346, filed on Sep. 30, 1986 in the name of Olaf Fjeldsend A/S it is described an apparatus for the magnetic treatment of the flowing liquid.

In the U.S. Pat. No. 5,141,296, filed on Jan. 28, 1993 in the name of Mearl E. Ellison, it is described a magnetic conditioning device for water, providing an inner chamber with a permanent magnet placed on a plurality of rod-like elements.

In the U.S. Pat. No. 4,711,271, filed on Dec. 8, 1987 in the name of Gale M. Weisembarger and John C. Moran it is described a magnetic conditioning device for fluids, having a magnetic flow path to increase the flow density.

In the U.S. Pat. No. 5,716,520 filed on Aug. 20, 1996 in the name of Elmer B. Mason it is described a fluid magnetic conditioning device.

A further solution available on the market is the one sold by Alga-ex International.

Even if many solutions are known, by which the problem has been faced to separate impurities from diesel engine fuel, none of the known solutions allows to obtain an optimum separation.

In this context it is included the solution suggested according to the present invention, allowing to optimise the separation of impurities from the diesel engine fuel, thus realising an enhanced ionising effect.

A further object of the present invention is that of providing a solution that can be realised for devices having each dimension.

Still another object of the present invention is that of providing a device of the above kind wherein the fuel passes through a magnetic field created by at least two magnets placed outside its flow, but within the conduct.

It is therefore specific object of the present invention a magnetic conditioning device for diesel engine fuel comprising a hosing element, placed along the fuel feeding line, having a fuel inlet and a fuel outlet, and providing a septum in correspondence of the inlet to deviate the inlet fuel, and an obliged path for the fuel, being provided at least two opposed magnetic elements, along said obliged path, inducing a magnetic field on the flowing fuel.

Preferably, according to the invention, said device provides a central cylindrical hub.

Furthermore, according to the invention, said obliged path has such a shape to ensure a long passage of the fuel within the device.

Always according to the invention, the magnetic field is created by permanent magnets, preferably neodymium magnets, having a protective anti-corrosion coating.

Still according to the invention, said permanent magnets can be comprised of ferrite.

Preferably, according to the invention, two permanent magnets are provided mounted opposed, said magnets having an opposed polarisation on the faces faced toward the fuel flow.

In a further embodiment of the device according to the invention, said magnetic elements are comprised of two ferromagnetic opposed elements, on which permanent magnets are provided, preferably having a tablet or ring shape, and an opposed polarisation of the faces faced toward the fuel flow, or with alternate polarisation between the permanent magnets placed side by side on the same ferromagnetic material, being provided permanent magnets having an opposed polarity respectively opposed faced each other.

Said permanent magnets can be flue with the ferromagnetic material or can be projecting with respect to the same.

Particularly, said permanent magnetic elements have a horseshoe shape.

Preferably, according to the invention, said device provides a lower portion and an upper portion, or lid, removably coupled each other.

Always according to the invention, projecting elements are provided, preferably metallic elements provided inside the container.

Preferably, said projecting elements are provided on one or both the inner surfaces of the device.

Furthermore, according to the invention, it can be provided an atmosphere vent.

Still according to the invention, said device can be comprised of a central body and two lids, respectively an upper and a lower lid.

The present invention will be now described, for illustrative but not limitative purposes, according to its preferred embodiments, with particular reference to the figures of the enclosed drawings, wherein:

FIG. 9 is a plan view of the lower part of the first embodiment of the device according to the invention;

FIG. 10 is a section view of the whole device of FIG. 9;

FIGS. 13a and 13b are plan views of the lower and upper parts of a third embodiment according to the invention of FIG. 1;

FIG. 14 is a section view of the whole device of FIG. 13;

FIGS. 17a and 17b are plan views of the lower and upper parts of a fifth embodiment according to the invention;

FIG. 18 is a section view of the whole device of FIG. 17;

device shown in the various enclosed figures exploits the magnetic field generated by permanent magnets to induce phenomenons of ionisation of the molecules present in the diesel engine fuel, obtaining the separation of particles accumulating within filters and tanks, that could cause a bad operation of engines, clogging filters and producing the accumulation of sludges within the tanks.

Observing the enclosed figures, wherein the various similar or corresponding elements are indicated by the same numeral references, and observing first FIGS. 1-3 and FIGS. 9-18, it can be noted a device according to the invention providing a box 1, within which a cylindrical space is realised delimited by the walls and a central cylinder. Within said space a septum 2 is provided in correspondence of the entrance (indicated by arrow A) of the fluid fuel, obliging the latter to cover the duct between walls and cylindrical hub within which the magnetic field is created.

Geometry of the device according to the invention is studied to ensure a long path of the fluid fuel within the magnetic field, in such a way to obtain a high efficiency of the ionising action.

As it can be noted from the figures, creation of the fuel is obtained by permanent magnets 4, preferably neodymium magnets, having an anti-wearing protective coating, or ferrite magnets, or other kind of magnets.

The use of neodymium, contrary to the ceramic magnets employing ferrite, allows to obtain high intensity of the magnetic field, with the same geometric sizes, far more higher than the other magnets, thus obtaining an increase of the performances.

Observing all the enclosed figures, it can be noted that the shape and the positioning of the magnets are innovative.

Figure 1:
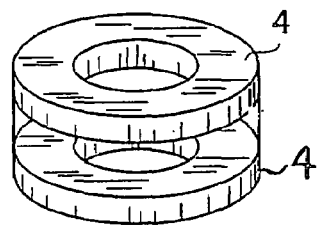
FIG. 1 is a schematic perspective view of a first embodiment of a device according to the invention.
Figure 4:
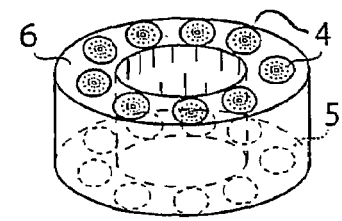
FIG. 4 is a schematic perspective view of a second embodiment of a device according to the invention.
Figure 2:
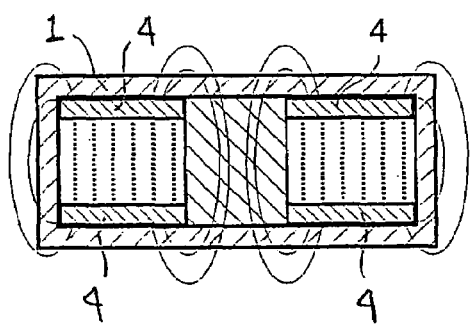
FIG. 2 is a first section view of the device of FIG. 1.
Figure 5:
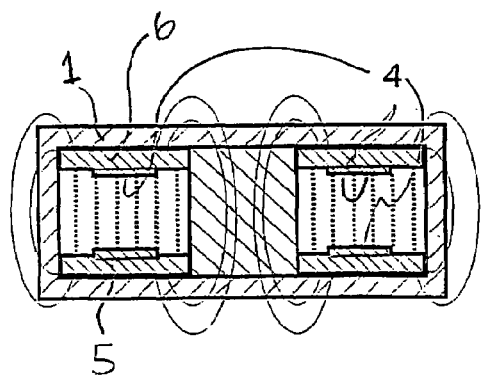
FIG. 5 is a first section view of the device of FIG. 4.
Figure 3:
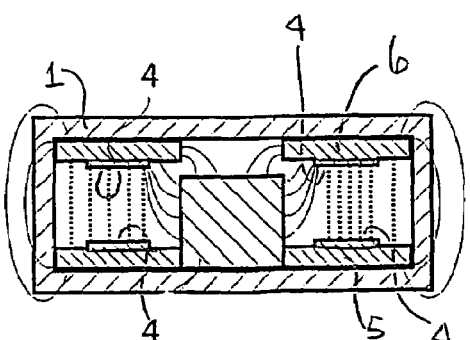
FIG. 3 is a second section view of the device of FIG. 1.
Figure 6:
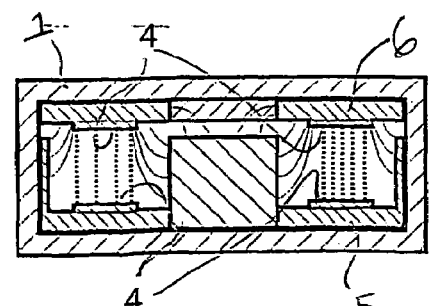
FIG. 6 is a second section view of the device of FIG. 4.
Figure 7:
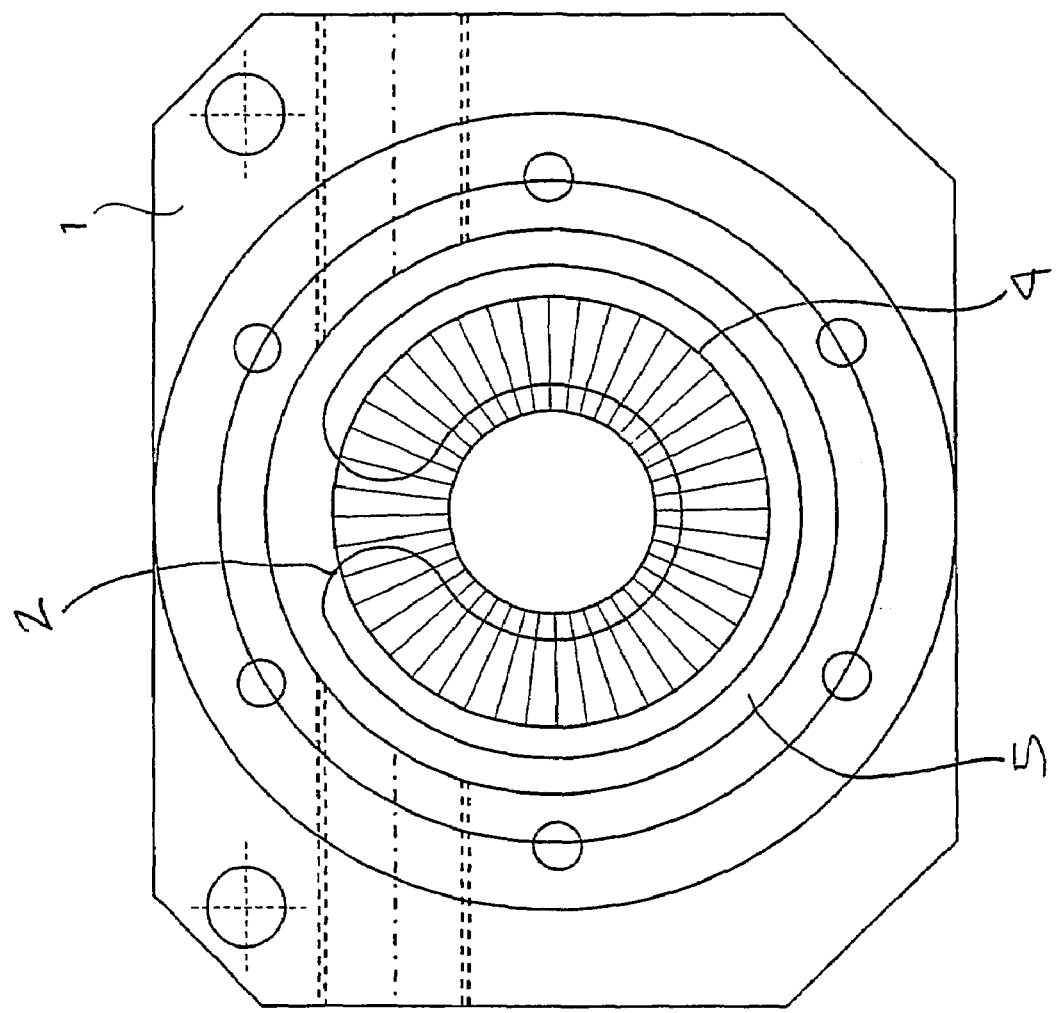
FIG. 7 is a plan view of a device according to the first embodiment.
Figure 8:
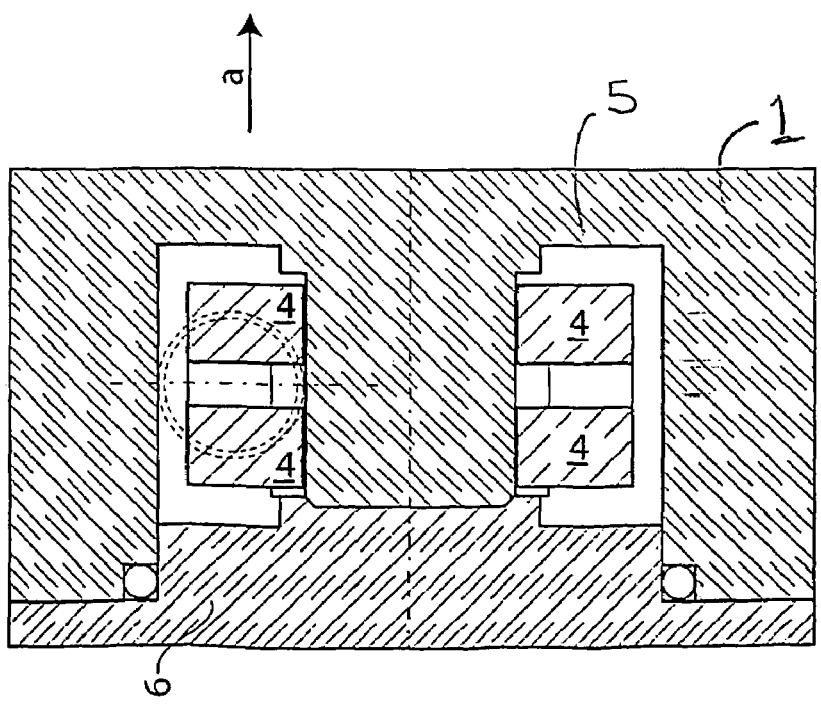
FIG. 8 is a section view of the device of FIG. 7.
Figure 11B:
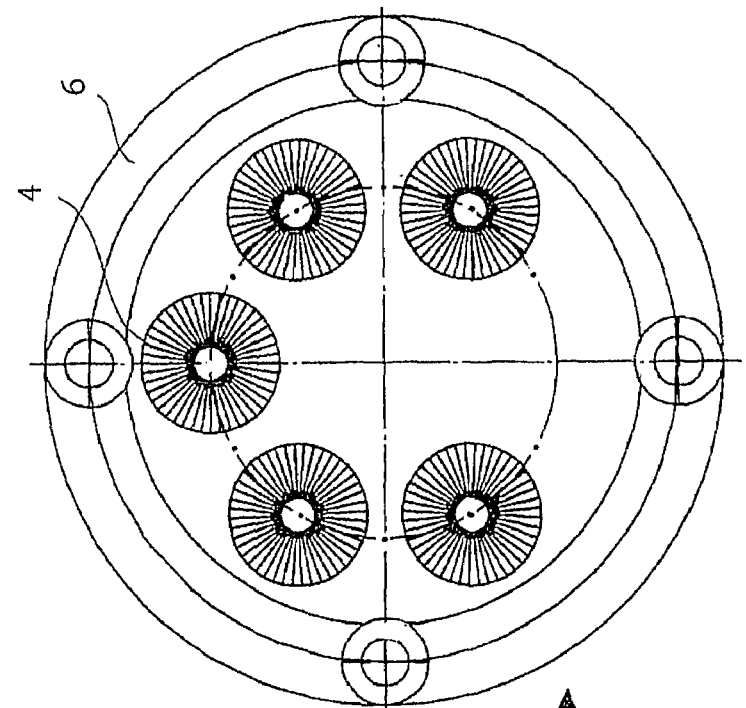
FIGS. 11a and 11b are plan views of the lower and upper parts of a second embodiment according to the invention of FIG. 1.
Figure 11A:
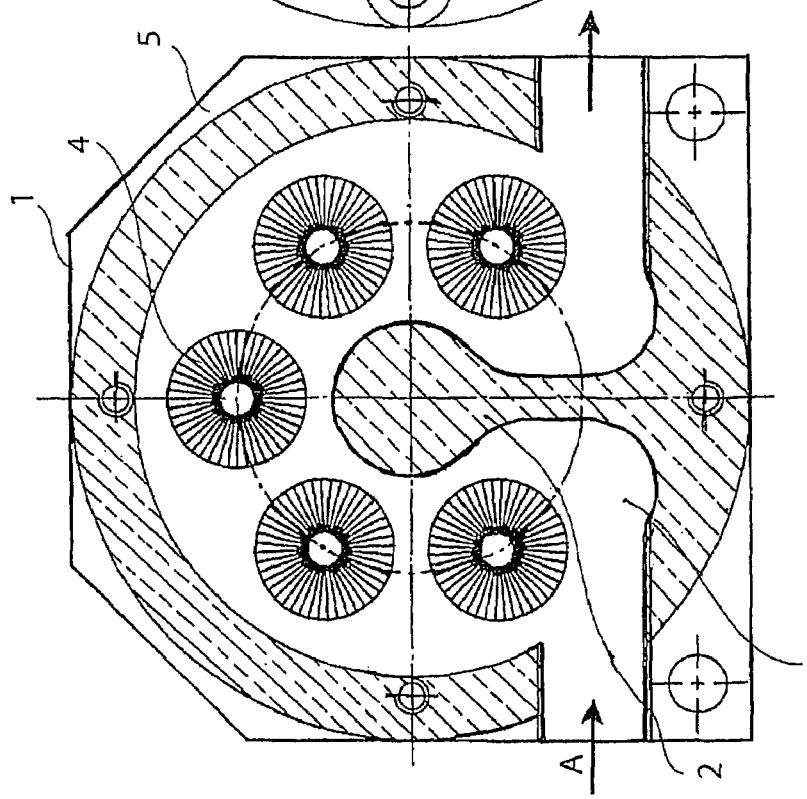
Figure 12:
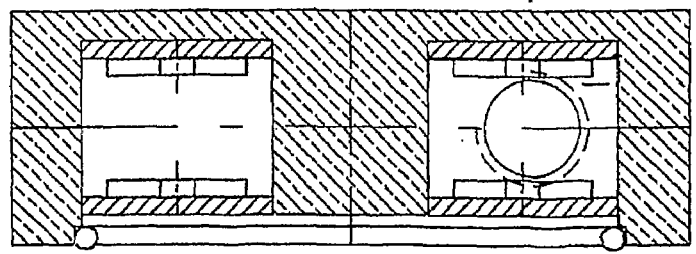
FIG. 12 is a section view of the whole device of FIG. 10.
Figure 15B:
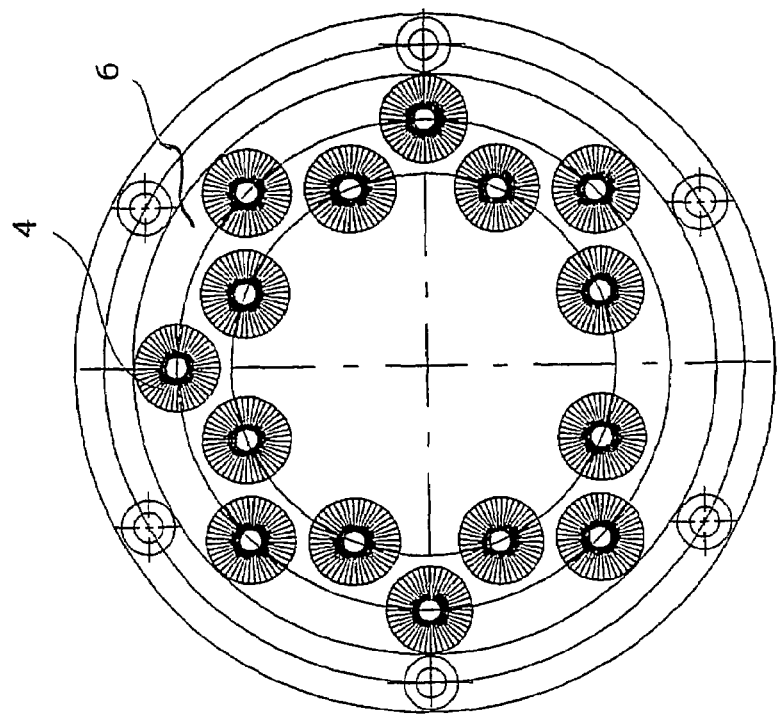
FIGS. 15a and 15b are plan views of the lower and upper parts of a fourth embodiment according to the invention.
Figure 15A:
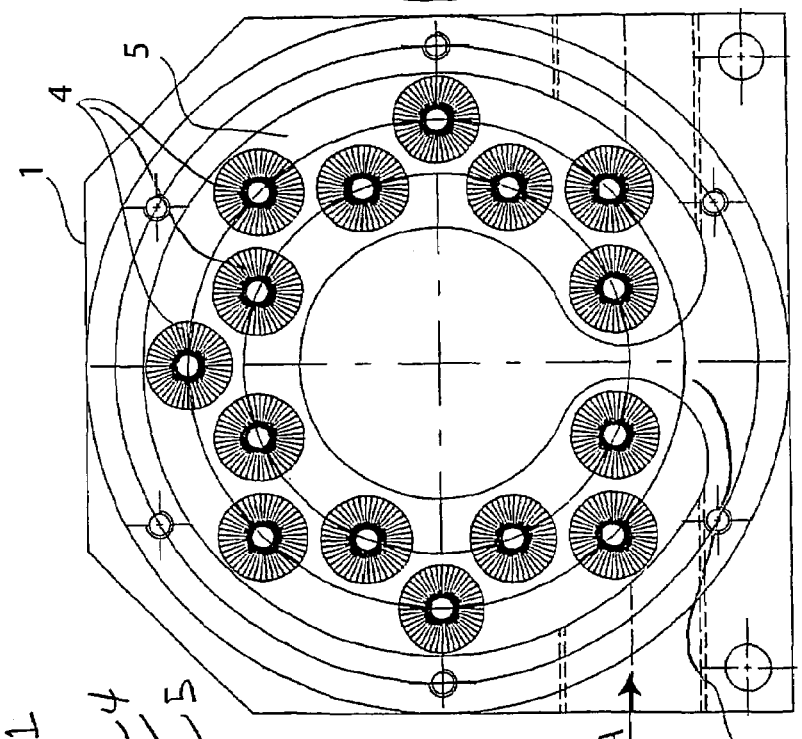
Figure 16:
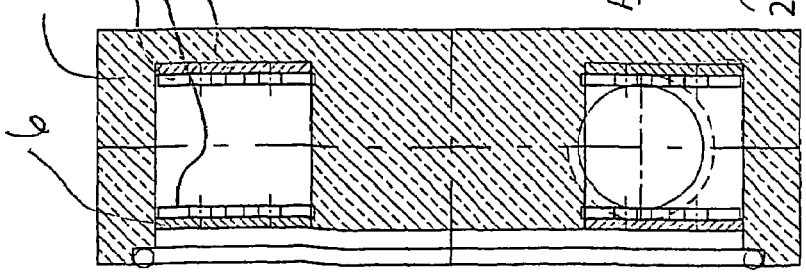
FIG. 16 is a section view of the whole device of FIG. 15.
Figure 19B:
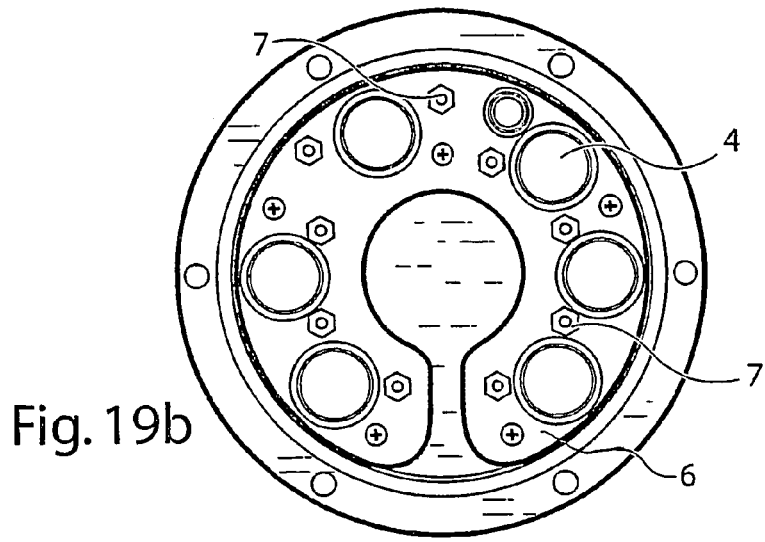
FIGS. 19a and 19b are plan views of the lower and upper parts of a sixth embodiment according to the invention.
Figure 19A:
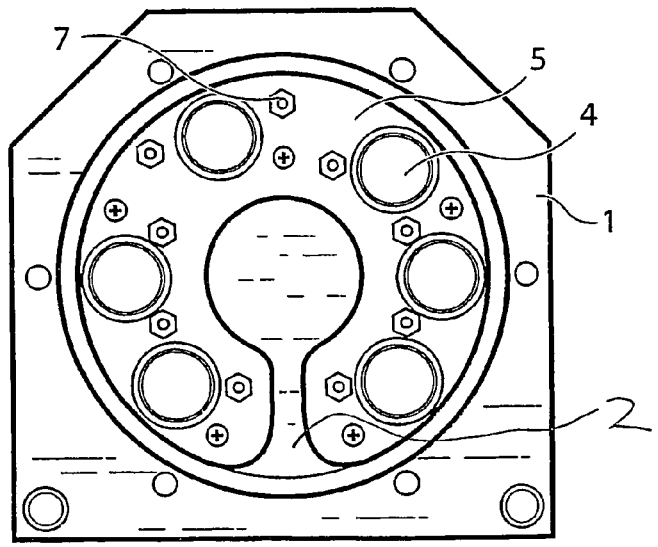

Magnets of the embodiment of FIGS. 1-3 and 7-8 are comprised of two ring shaped permanent magnets 4, opposed each other, while in the embodiment shown in FIGS. 4-6 are comprised of two opposed rings made up of ferromagnetic material, on which permanent magnets 4 are mounted, having a cylindrical integral tablet shape or a ring shape. Ring magnets and magnet bearing ferromagnetic rings are spaced in such a way to allow the fuel flowing through the duct (3) inside the device, defined by their surface faced toward the inside of the box 1 and by the walls of the same box, and respectively placed on the bottom (lower ring) 5 and under the lid (upper ring) 6 on the cylinder placed at the centre of the device bow 1, that can be comprised of the same material of the box, or partially comprised of ferromagnetic material, or of other material.

In FIGS. 19-21 and 22-23 two further embodiments of the device according to the invention are shown, wherein the elements corresponding to those of the previous embodiments are indicated by the same numeral references.

In the two solutions shown in the above figures, beside the magnets 4, projecting metallic elements 7 have been added, improving turbulence of the fuel.

The difference between the two embodiments is due that said projecting elements 7 are provided on all the two surfaces (FIGS. 19-21) or only on the bottom 5 (FIGS. 22-23), the choice depending on the dimensions and on the use of the device according to the invention.

Figure 20:
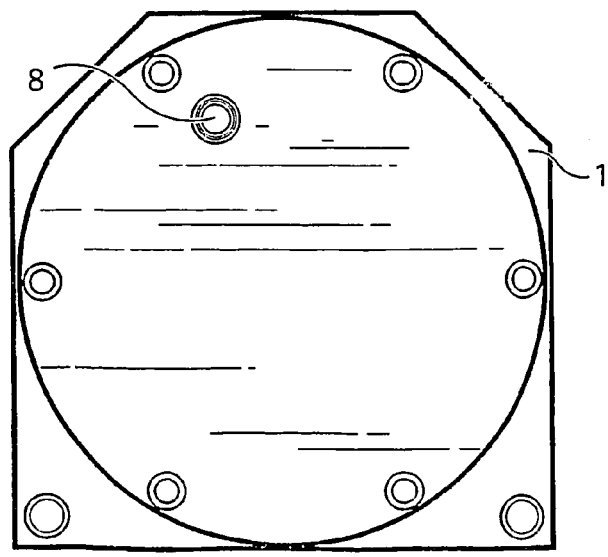
FIG. 20 is a plan view of the device of FIGS. 19a and 19b.
Figure 21:
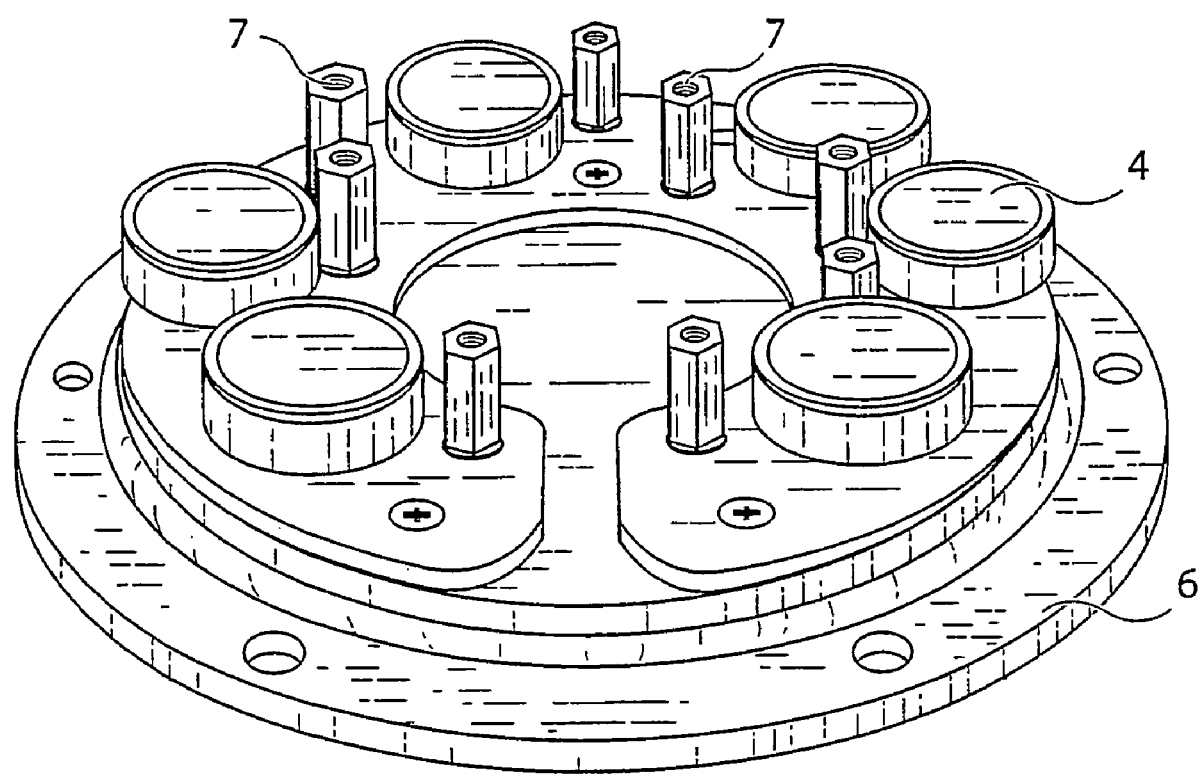
FIG. 21 is a perspective view of the element of FIG. 19b.
Figure 22B:
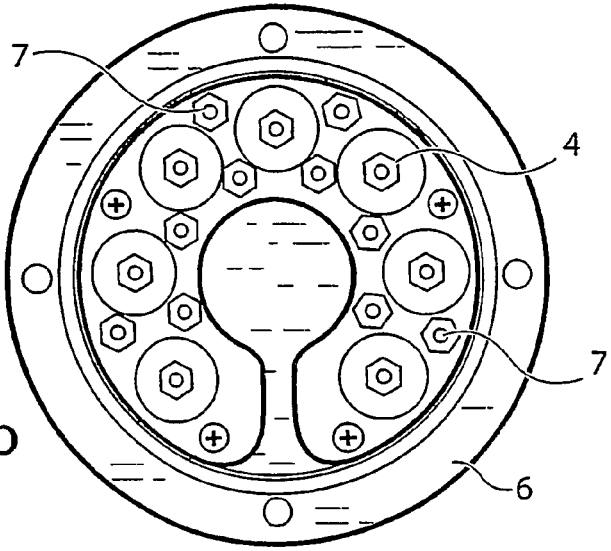
FIGS. 22a and 22b are plan views of the lower and upper parts of a seventh embodiment according to the invention.
Figure 22A:
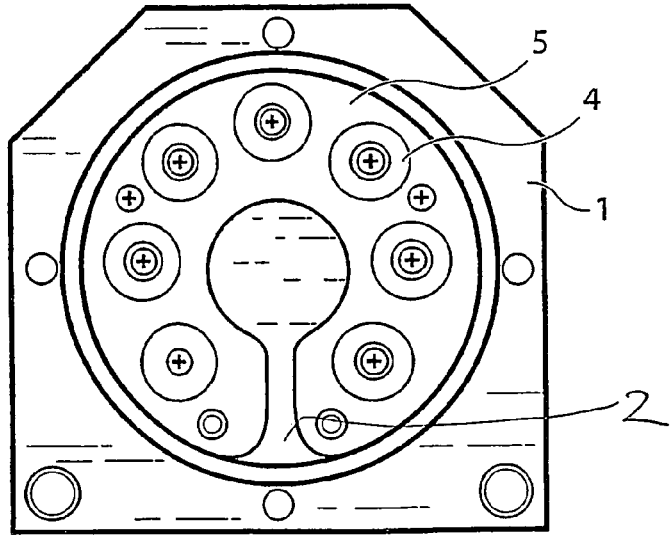
Figure 23:
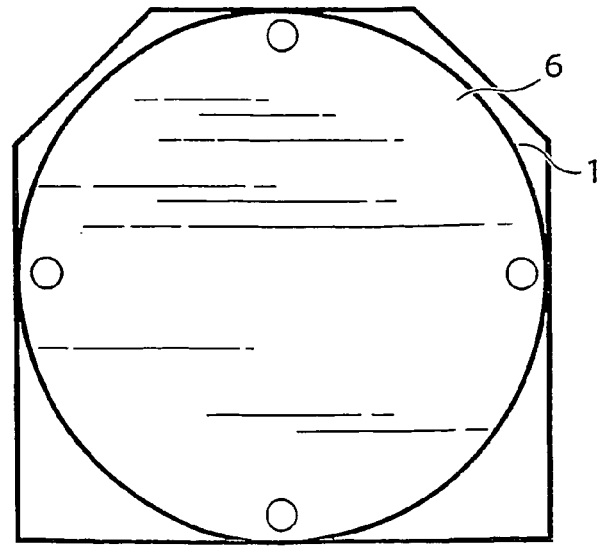
FIG. 23 is a plan view of the device of FIGS. 22a and 22b.

Furthermore, in the device of FIG. 20 it is shown a vent 8 for venting air that could dangerously accumulate within the container 1. The provision of the vent 8 too is due to the dimensions and to the use of the device according to the invention.

In the embodiment providing the use of ring permanent magnets, magnetic polarisation is opposed on the upper and lower faces of each ring and the rings are mounted in such a way that their surfaces faced toward the inner duct have opposed polarity.

When ferromagnetic rings and multiple permanent magnets are provided, permanent magnets have a cylindrical tablet or ring shape, with north and south polarity on the full opposed faces of the same tablet, having such dimensions to be mounted on the ferromagnetic rings along a single or more rows.

In case multiple permanent magnets are provided, magnets are fixed on the rings by not ferromagnetic screws or by fixed joint and provided according to a simple or multiple circle, with the same magnetic polarity faced toward the surface of each ring.

As it is well evident, surface of the tablets faced inside the duct can be flue with the same surface of the ferromagnetic ring on which they are mounted, or slightly projecting, in order to create a turbulence in the fluid. Said turbulence has a positive effect in promoting the action of the device according to the invention.

By this positioning, each one of the ferromagnetic rings becomes a single permanent magnet, faced toward the space where a single magnetic polarisation flows.

Positioning of the magnetic tablets is realised in such a way that the lower ring and the upper ring have opposed polarity, thus creating within the inner space included between them a high intensity uniform magnetic field.

Central cylinder, if made up of ferromagnetic material, is in touch with the lower ferromagnetic ring, but has a cylindrical spacer, made up of not ferromagnetic material, with respect to the upper ring, in such a way to create a space wherein a magnetic field exists.

It is further provided a further embodiment comprised of a ferromagnetic cylinder, having a small thickness and empty inside, that can be placed as a coating of the lateral wall of the device box. This solution allows to substantially annul the field outside the box of the device, thus realising a path for the closure of the magnetic field between the upper ring and the lower ring with a reluctance reduced with respect to the outer space.

All the described constructive choices allow to obtain intensity and distribution of the dimensions of the circulation channel for the fuel fluid, necessary by the engine power to which the device is applied.

Furthermore, the use of the constructive and technological solutions allows to limit the magnetic field dispersed outside the device and to concentrate the same inside the space useful for the exposition of the fuel fluid.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. Magnetic conditioning device for diesel engine fuel, comprising:
    a housing element (1) configured to be placed along a fuel feeding line, the housing element having a fuel inlet, and a fuel outlet, a top, and a bottom;
    two opposed ferromagnetic material elements (5, 6) located within the housing element, a first of the two elements (5) being at the top of the housing and a second of the two elements (6) being at the bottom of the housing;
    permanent magnets (4) mounted on and between the two opposed ferromagnetic material elements; and
    a fuel duct defined inside the housing element from the fuel inlet to the fuel outlet, the fuel duct being between the top and the bottom of the housing and between the magnets,
    the magnets inducing a magnetic field between the two opposed ferromagnetic material elements and within the fuel duct, and
    the fuel duct turbulently deviating fuel entering the fuel inlet, through the magnetic field induced by the magnets, to the fuel outlet, wherein,
    a first set of magnets are mounted to the first of the two elements,
    a second set of magnets are mounted to a second of the two elements,
    the first set of magnets are spaced apart from the second set of magnets and project toward the second set of magnets and into the fuel duct, and
    the second set of magnets are spaced apart from the first set of magnets and project toward the first set of magnets into the fuel duct.

2. Magnetic conditioning device for diesel engine fuel according to claim 1, wherein,
    said two ferromagnetic opposed elements are rings, and
    facing surfaces of said rings have opposite polarizations.

3. Magnetic conditioning device for diesel engine fuel according to claim 1, wherein,
    said two ferromagnetic opposed elements are rings,
    the first set of magnets are aligned with the second set of magnets,
    the fuel duct is located between the first set of magnets and the second set of magnets, and
    facing surfaces of the first and second set of magnets have opposite polarizations.

4. Magnetic conditioning device for diesel engine fuel according to claim 1, wherein,
    said fuel duct is defined by a wall located inside the housing element and extending along a centerline of the housing element to divide the fuel duct into two parts, with i) a first part located to a first side of the wall adjacent the fuel inlet and ii) a second part located to an opposite second side of the wall adjacent the fuel outlet.

5. Magnetic conditioning device for diesel engine fuel, comprising:
    a housing (1) with a fuel inlet and a fuel outlet;
    two opposed ferromagnetic rings (5, 6) located within said housing;
    a first set of permanent magnets (4) mounted on a first of said two rings;
    a second set of permanent magnets (4) mounted on a second of said two rings,
    said first and second sets of permanent magnets being spaced apart; and
    a fuel duct defined inside the housing from the fuel inlet to the fuel outlet, and between said first and second sets of permanent magnets,
    the magnets inducing a magnetic field, between the two opposed elements and along the fuel duct, to ionize fuel within the fuel duct, and
    the fuel duct turbulently deviating fuel entering the fuel inlet, through the magnetic field induced by the magnets, to the fuel outlet.

6. Magnetic conditioning device for diesel engine fuel according to claim 5, wherein,
    said fuel duct is defined by a wall located inside the housing and extending along a centerline of the housing element to divide the fuel duct into two parts, with i) a first part located to a first side of the wall adjacent the fuel inlet and ii) a second part located to an opposite second side of the wall adjacent the fuel outlet.

7. Magnetic conditioning device for diesel engine fuel, comprising:
    a housing element (1) configured to be placed along a fuel feeding line, the housing element having a fuel inlet, and a fuel outlet, a top, and a bottom;
    two opposed ferromagnetic material elements (5, 6) located within the housing element, a first of the two elements (5) being at the top of the housing and a second of the two elements (6) being at the bottom of the housing;
    permanent magnets (4) mounted on and between the two opposed ferromagnetic material elements; and
    a fuel duct defined inside the housing element from the fuel inlet to the fuel outlet, the fuel duct being between the top and the bottom of the housing and between the magnets,
    the magnets inducing a magnetic field between the two opposed ferromagnetic material elements and within the fuel duct, and
    the fuel duct turbulently deviating fuel entering the fuel inlet, through the magnetic field induced by the magnets, to the fuel outlet, wherein,
    said two ferromagnetic opposed elements are rings, and
    facing surfaces of said rings have opposite polarizations.

* * * * *